United States Patent [19]
Kasamatsu et al.

[11] Patent Number: 5,982,792
[45] Date of Patent: Nov. 9, 1999

[54] SOLID-STATE LASER DEVICE

[75] Inventors: Tadashi Kasamatsu; Hitoshi Sekita, both of Tokyo, Japan

[73] Assignee: NEC Corporation, Tokyo, Japan

[21] Appl. No.: 09/063,053

[22] Filed: Apr. 21, 1998

[30] Foreign Application Priority Data

Apr. 21, 1997 [JP] Japan .................................. 9-103307

[51] Int. Cl.⁶ ............................................... H01S 3/04
[52] U.S. Cl. ............................ 372/35; 372/34; 372/36; 372/39; 372/43; 372/50
[58] Field of Search ................... 372/21, 22, 34, 372/35, 36, 39, 69, 70, 43

[56] References Cited

U.S. PATENT DOCUMENTS

| | | | |
|---|---|---|---|
| 4,429,394 | 1/1984 | Guch, Jr. ..................................... | 372/34 |
| 4,653,056 | 3/1987 | Baer et al. .................................. | 372/27 |
| 4,791,634 | 12/1988 | Miyake ....................................... | 372/34 |
| 4,852,109 | 7/1989 | Kuchar ....................................... | 372/34 |
| 5,253,260 | 10/1993 | Palombo ..................................... | 372/43 |
| 5,272,710 | 12/1993 | Sumida et al. ............................. | 372/35 |
| 5,299,213 | 3/1994 | Kuba et al. ................................. | 372/35 |
| 5,311,528 | 5/1994 | Fujino ........................................ | 372/35 |
| 5,317,585 | 5/1994 | Gregor ....................................... | 372/35 |
| 5,440,574 | 8/1995 | Sobottke et al. .......................... | 372/34 |
| 5,781,574 | 7/1998 | Connors et al. ........................... | 372/35 |
| 5,790,575 | 8/1998 | Zamel et al. ............................... | 372/35 |
| 5,892,783 | 4/1999 | Holsinger ................................... | 372/34 |

FOREIGN PATENT DOCUMENTS

| | | | |
|---|---|---|---|
| 3-204984 | 9/1991 | Japan .................................... | 372/35 X |
| 4-157778 | 5/1992 | Japan .................................... | 372/35 X |

*Primary Examiner*—Brian Healy
*Attorney, Agent, or Firm*—Foley & Lardner

[57] ABSTRACT

In a quasi-three-level solid-state laser that is excited by a semiconductor laser, a temperature-controlling apparatus is used to operate the crystal temperature that enables optimum laser operation in terms of both efficiency and output, based on the effect that cooling the crystal has on reducing the efficiency of absorption of power from the semiconductor excitation laser and the effect that cooling the crystal has on lowering the oscillation threshold value.

10 Claims, 4 Drawing Sheets

OPTIMUM OPERATING TEMPERATURE RANGE
(PRESENT INVENTION)

SOLID-STATE LASER DEVICE

BACKGROUND OF THE INVENTION

1. Field of the Invention

The present invention relates to a solid-state laser and more specifically to a semiconductor-laser-pumped solid-state laser.

2. Description of Related Art

In recent years, there has been active research and development conducted with regard to solid-state lasers with semiconductor laser excitation, and in the electronics and machinery industry, a switch is being made from lamp excitation to semiconductor laser excitation, in such lasers as low-output solid-state lasers.

In the most commonly used type of laser, the Nd:YAG laser (Neodium YAG; wavelength: 1.06 micron), a highly reliable semiconductor laser excited solid-state laser has been developed, relying on high crystal quality and accumulated technology.

However, in the case of exciting an Nd:YAG crystal using a semiconductor laser, while the excitation wavelength is 808 nm, the laser wavelength is 1064 nm, the quantum efficiency, which is the photon energy ratio, is 76%.

The laser optical-to-optical conversion efficiency intrinsically cannot exceed this value. Accompanying this, there is an unavoidable conversion of the 30% of the excitation power (the heat generation ratio) to heat.

For this reason, in the case of high-power excitation, the heat generated in the Nd:YAG crystal causes a rise in temperature, this causing distortion in the crystal.

When excitation is excessive, the thermal stress exceeds the mechanical strength of the crystal, this leading to its destruction. Additionally, the temperature rise within the crystal causes the formation of a thermal lens and thermal birefringence in the crystal, this causing a deterioration of the laser characteristics (efficiency and beam quality).

In general, in a high-output laser having an output of 100 W or greater, these thermally caused phenomena appear prominently, and such characteristics as laser efficiency and beam quality are considerably worse than those of a low-output laser.

Recently, there has been active research and development with regard to solid-state lasers having a wavelength in the 1-micron band which use active ions other than neodymium.

Of these, the above-noted quantum efficiency of a Yb (ytterbium) solid-state laser and particularly a Yb:YAG laser is excited by a semiconductor laser having a wavelength in the range from 940 or 970 nm and emitting light at 1030 nm and thus the quantum efficiency of the Yb:YAG laser exceeds 90%.

For this reason, the intrinsic efficiency is high. Additionally, because the heat generation ratio is approximately 10%, scaling to a high output can be simply done to three times that of an Nd:YAG laser.

Other superior features of ytterbium include wide absorption spectrum lines (approximately from 2.5 times to 10 times that of Nd:YAG; note that 18 nm at 940 nm and 4 nm at 970 nm), a large absorption cross section and no up-conversion or excited state absorption.

However, because the laser lower level is a Stark level within the ground-state manifold (quasi-three-level system), as much as 5% of all of the ytterbium ions are in a thermally excited condition in the laser lower level at room temperature.

For this reason, it is difficult to achieve the population inversion that is required for laser oscillation and additionally, because the number of population at the lower laser level exhibits a dependency on temperature, the laser oscillation threshold value and output performance are also dependent upon temperature.

In the past, to achieve high efficiency and high output by reducing the number of population of the lower levels, the crystal was cooled.

For example, in Optics letters, Vol. 16, page 1089 (1991), there is a report of a Yb:YAG laser excited at 941 nm and operated at two points, with the crystal at room temperature (27° C.) and at the temperature of liquid nitrogen (−196° C.).

In Applied Physics B, Vol. 58, page 365 (1994), there is a report of a Yb:YAG laser excited at 940 nm and 970 nm, in which the crystal temperature is varied from −193° C. to +27° C. using a cryostat utilizing the liquid nitrogen.

In both of these reports, a continuously oscillating titanium sapphire laser was used as the excitation light source.

In Optics Letters, Vol. 21, page 480 (1996), there is a report of a Yb:YAG laser which is excited at 940 nm by a semiconductor laser, in which the crystal is held at a temperature of 15° C. using a Peltier element.

And in Trends in Optics and Photonics, Vol. 1, page 12, there is a report of a Yb:YAG laser which is excited at 940 nm by a semiconductor laser, in which the crystal is cooled to −70° C.

The laser characteristics in the case of a semiconductor laser pumped Yb:YAG laser, which is extremely attractive for use in industrial applications are completely different from the above-described case of a titanium sapphire excited Yb:YAG laser.

One completely different aspect is that there is the one in that "change in the absorption efficiency with respect to the excitation semiconductor laser power is caused by a change in the absorption spectrum of the crystal which accompanies a change in the crystal temperature".

With cooling, the absorption line width narrows, thereby reducing the absorption peak value.

For this reason, in a Yb:YAG laser that is excited by a semiconductor laser, the emission spectral width of the semiconductor laser is approximately the same as the absorption line width of the crystal, so that a reduction in spectrum overlap, this causing a prominent change in the absorption efficiency.

The emission spectrum of the continuously oscillating titanium sapphire laser is less than 0.1 nm, so that the absorption efficiency is not caused by the change in absorption line width.

In the past, in a Yb:YAG laser that is pumped by a semiconductor laser that operates either near room temperature or at approximately −70° C., the lower levels population was not sufficiently reduced, leading to the problems of "not being able to obtain the optimum output" and "low optical-to-optical conversion efficiency."

However, in the case of excessively cooling the crystal to the region of −200° C., although the lower level population is sufficiently reduced, the absorption efficiency of the excitation power in a Yb:YAG laser that is pumped by a semiconductor laser decreased, leading to the problems of reduced output and reduced efficiency.

Additionally, cooling to a low temperature such as −200° C. requires a cryostat which uses a medium such as liquid nitrogen. For this reason, for continuous operations of the laser, it is necessary to feed a coolant from outside, making on-site use in production difficult, due to an extreme complicated controlling system therefor and high producing cost.

Additionally, the above-noted problems are exhibited in common in a quasi-three-level laser.

SUMMARY OF THE INVENTION

Therefore, the object of the present invention is to improve these disadvantages in the conventional technologies and to provide a solid-state laser device having simplified laser system and enabling long service life, and which reduces the running cost of the laser.

To attain the above-mentioned object of the present invention, a solid-state laser device basically has the technical construction in which the solid-state laser device comprises a quasi-three-level solid-state laser excited by light energy and having a solid-state laser crystal and the device further comprises a temperature-controlling cooling apparatus that maintains a crystal temperature of said solid-state laser crystal at around −100±20° C.

And further, in the present invention, the solid-state laser device may have a temperature-controlling cooling apparatus which can be operated only by electric power without any coolant or liquid nitrogen or the like.

Moreover, in the solid-state laser device of the present invention, the quasi-three-level solid-state laser may be excited by a semiconductor laser.

Further in the present invention, the solid-state laser device comprises a solid-state laser crystal of said quasi-three-level solid-state laser which comprises ytterbium (Yb) as an activated ion.

In the present invention, as described above, by controlling the laser crystal's operating temperature to an appropriate temperature, it is possible to achieve both a large optical-to-optical conversion efficiency of the semiconductor laser excited quasi-three-level solid state laser and a large output, enabling a reduced power output and a high output.

Additionally, because excessive cooling is not required, a coolant such as liquid nitrogen is not necessary.

By using a closed-cycle chiller which uses antifreeze as a coolant, or a cooling apparatus which makes use of adiabatic expansion, it is possible to operate a laser with only an electrical input. For this reason, it is possible to adopt this as a solid-state laser device for use in industrial applications.

DETAILED DESCRIPTION OF THE PREFERRED EMBODIMENTS

The case of a Yb:YAG quasi-three-level laser will be described, with references made to relevant drawings and equations.

Figure 2:
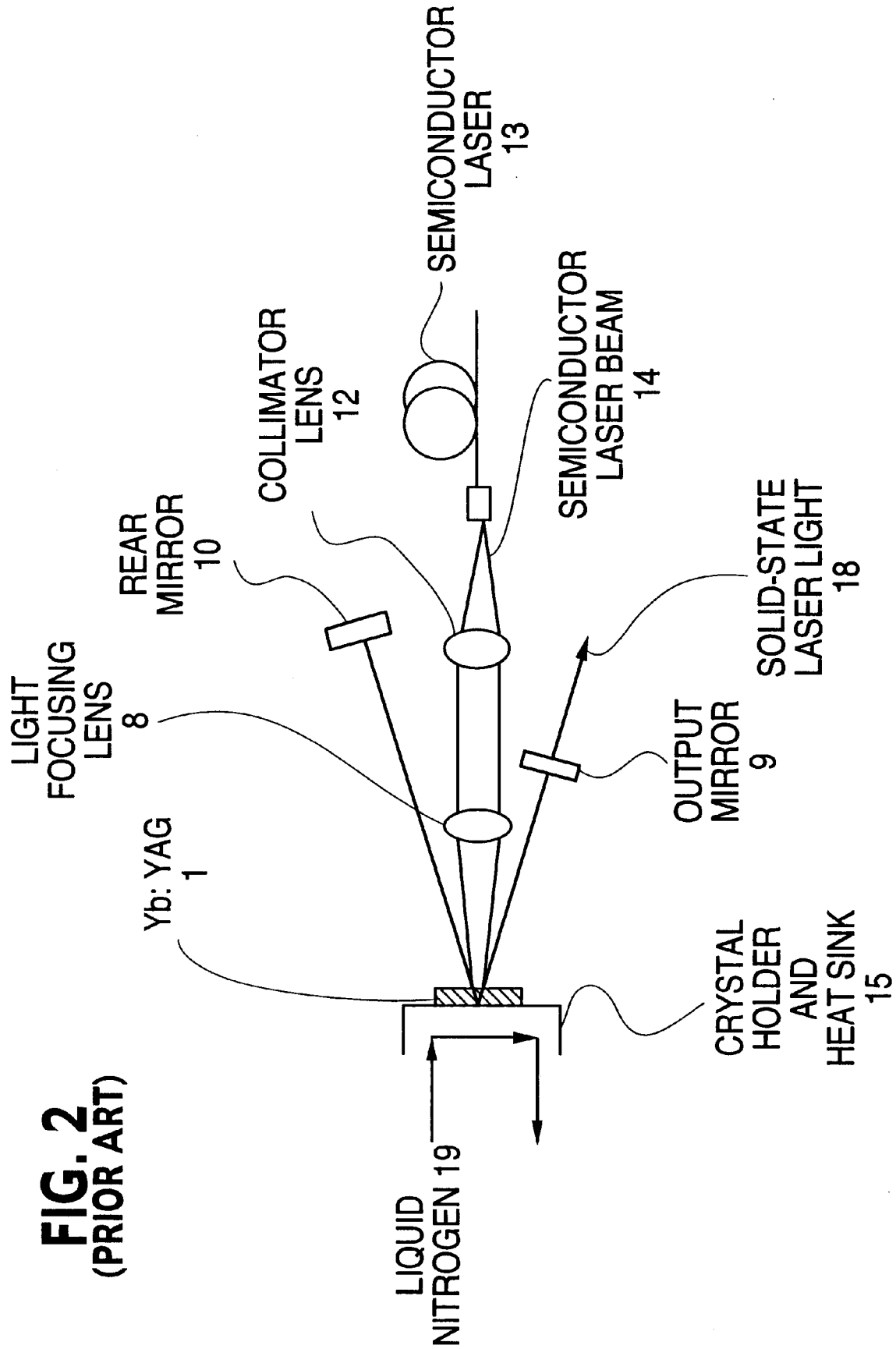
FIG. 2 is a drawing which illustrates the prior art.

FIG. 2 shows one embodiment of the prior art. In a conventional system, a solid-state laser is obtained by means of a V-shaped resonator formed with a rear mirror 10 and an output mirror 9, with a Yb:YAG crystal 1 at the vertex and which is excited by light, semiconductor laser beam 14 emitted from a semiconductor laser 13 through a collimator lens 12 and a light collecting lens 8.

While this drawing shows the case of an "active mirror", in which a thin disc-shaped Yb:YAG crystal 1 is joined to a heat sink 15, the present invention as will be described below, is intrinsically capable of bringing about the same effect regardless of the configuration (for example, with end pumping or transverse pumping).

In the past, to cool a ytterbium crystal 1 to a low temperature a cryostat such as shown in FIG. 2, which uses liquid nitrogen 19, was used. In this case, to operate the laser continuously, it is necessary to intermittently (periodically) supply liquid nitrogen, which acts as a coolant, from the outside, this making adoption to industrial applications difficult.

Figure 1:
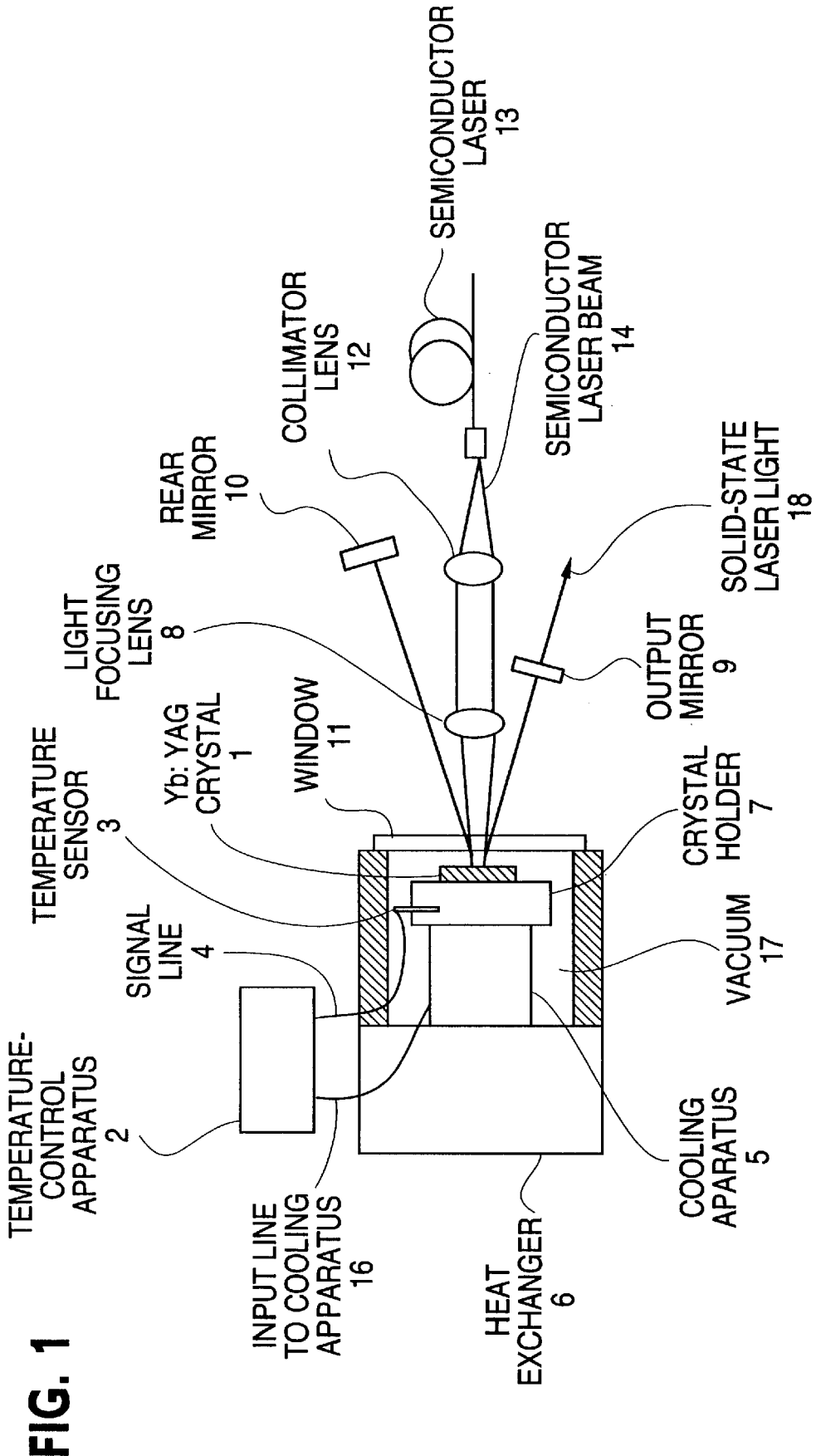
FIG. 1 is a drawing which shows an embodiment of the present invention.

With the present invention, however, by placing the crystal inside a package that is vacuum sealed as shown in FIG. 1 (or sealed with dry nitrogen), the cryostat is eliminated, so that by cooling down to the region of around −100° C., which is possible with an electrical input alone, it is possible to achieve high output and high efficiency of the laser itself, and because a coolant is not necessary, adoption into industrial applications is facilitated.

Using a low-temperature closed-cycle cooling apparatus or a Stirling cooler which cools by means of adiabatic expansion, it is possible to cool down to the region of −100° C. with only an electrical input.

The basic construction of the solid-state laser device of the present invention will be described with reference to FIG. 1.

As shown in FIG. 1, the solid-state laser device of the present invention comprises a V-shaped resonator formed with a rear mirror 10 and an output mirror 9, with a Yb:YAG crystal 1 at the vertex and which is excited by light, semiconductor laser beam 14 emitted from a semiconductor laser 13 through a collimator lens 12 and a light focussing lens 8.

Figure 5:
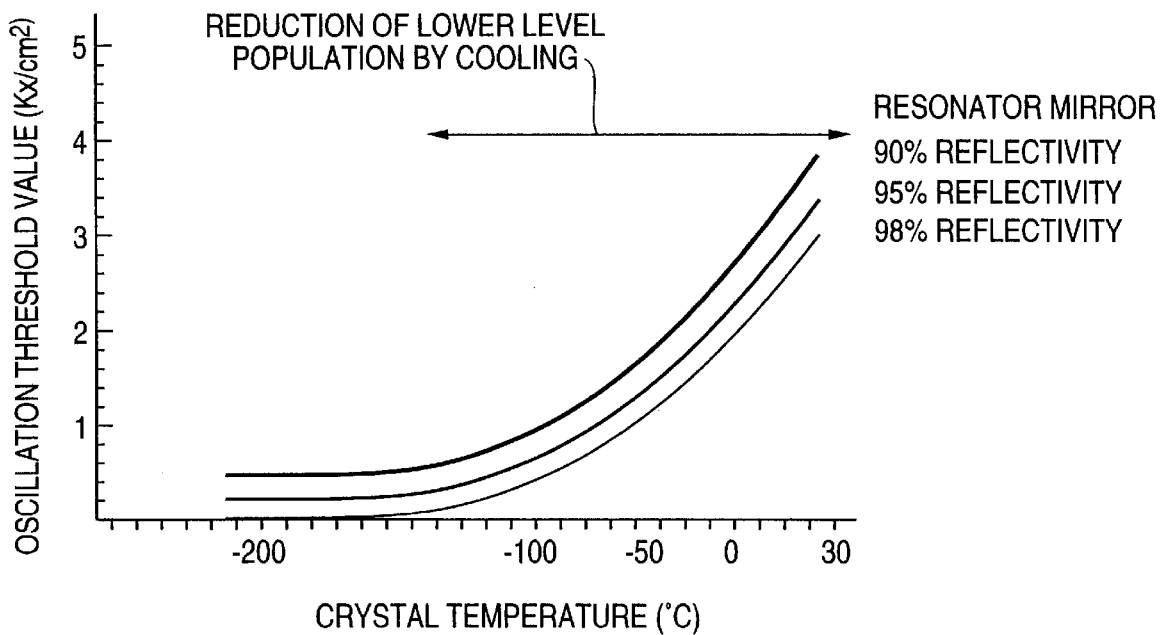
FIG. 5 is a drawing which illustrates the present invention (the temperature dependency of the oscillation threshold in a quasi-three-level laser).

In that, the output laser beam 18 will be output from the output mirror 9, and the output level of the laser beam 18 will be set depending upon an oscillation threshold value determined by a predetermined reflectivity of the resonator mirror 9, as shown in FIG. 5.

In the present invention, as shown in FIG. 1, the quasi-three-level solid-state laser 1 is contacted to a crystal holder 7 which is provided inside a package 17 which is kept at a vacuum condition therein and a cooling device 5 which can be controlled by a suitable temperature controlling device 2 which can cool the quasi-three-level solid-state laser 1 only with an electric signal supplied thereto through wires 16 connecting the temperature controlling device 2 and the cooling device 5 at a temperature at around −100±20 ° C.

In the present invention, the cooling device 5 may be connected to a suitable heat-exchanger 6, if necessary and further the semiconductor laser beam 14 can irradiate a surface of the quasi-three-level solid-state laser 1 through a suitable window 11 provided on a front surface side of the solid-state laser device.

In the present invention, the solid-state laser device is further provided a temperature sensor for sensing the temperature of the quasi-three-level solid-state laser 1 and the temperature information as detected by the sensor should be transferred to the temperature controlling device 2 through a suitable signal line 4.

As explained above, the solid-state laser device of the present invention basically comprises a quasi-three-level solid-state laser excited by light energy and having a solid-state laser crystal and the device further comprises a temperature-controlling cooling apparatus that maintains a crystal temperature of the solid-state laser crystal at around −100±20 ° C.

In the present invention, the solid-state laser device can be provided with the temperature-controlling cooling apparatus which can only be operated by electric power.

Further in the present invention, the quasi-three-level solid-state laser as used for the solid-state laser device, may be excited by a semiconductor laser.

In the present invention, the solid-state laser crystal of the quasi-three-level solid-state laser is preferably ytterbium (Yb) as an active ion.

And more precisely explained about the quasi-three-level solid-state laser as used in the present invention is preferably either one of a Yb:YAG crystal comprising ytterbium as an activated ion and YAG (yttrium-aluminum-garnet) as a host material and a Yb:YAG crystal comprising ytterbium as an active ion and LuAG (lutetium-aluminum-garnet) as a host material.

Moreover, in the present invention, the solid-state laser crystal of the quasi-three-level solid-state laser can be preferably excited by a high-output semiconductor laser having at around 940 nm or 970 nm band, as an excited light power.

In the preferable embodiment of the present invention, the solid-state laser device may comprise a quasi-three-level solid-state laser crystal excited by light energy and the device further comprises a temperature-controlling cooling apparatus that operates the solid-state laser crystal at around a temperature of −100±20° C.

And further, in that, the solid-state laser crystal comprising a crystal selected from a quasi-three-level solid-state laser comprises a Yb:YAG crystal which comprises ytterbium as an active ion and YAG (ytterbium-aluminum-garnet) as a host material and a quasi-three-level solid-state laser comprises a Yb:YAG crystal which comprises ytterbium as an active ion and LuAG (lutetium-aluminum-garnet) as a base material and the quasi-three-level solid-state laser may preferably be excited by a high-output semiconductor laser having at 940 nm or 970 nm band, as an excited light power.

Next, the optimum temperature conditions from the standpoint of the temperature dependency of laser operation will be described.

In general, the output characteristics of a quasi-three-level laser can be described by the following equations (1) and (2).

$$P_{out}(T) = \eta_{abs}(T) \cdot \eta_B \cdot \eta_S \cdot \eta_C \cdot (P_{inc} - P_{th}(T)) \quad (1)$$

$$P_{th}(T) = \frac{A_{eff} I_s}{\eta_s} \left( \frac{\delta}{2} + \sigma_{em} f_a(T) N_o d \right) \quad (2)$$

In the above, $\eta_{abs}(T)$ is the temperature-dependent absorption efficiency, $\eta_B$ is the mode matching efficiency, $\eta_S$ is the Stokes factor (i.e., (excitation wavelength)/(laser wavelength)), $\eta_C$ is the output coupling efficiency, $P_{inc}$ is excitation power incident to the crystal, $P_{th}(T)$ is the temperature-dependent oscillation threshold power value (incident to the crystal, $P_{out}(T)$ is the temperature-dependent output power, T is the crystal temperature, $A_{eff}$ is the effective mode cross-section area, $I_s$ is the saturation intensity, $\sigma_{em}$ is the stimulated emission cross section, $N_o$ is the doping concentration of the activated element, d is the crystal length, $f_a(T)$ is the lower-state fractional occupation and $\delta$ is the resonator loss.

In a 4-level laser such as that using Nd:YAG, although the absorption efficiency exhibits temperature dependency, the temperature dependency of the oscillation threshold value is not as pronounced as in the case of a quasi-three-level laser.

First, the effect of increasing output by virtue of the reduction of the occupation ratio of lower levels will be described.

The lower level occupation ratio $f_a(T)$ is a proportion of all the ytterbium ions added to the crystal which is at a laser lower level.

The larger this value is, the larger is the population at the lower level, and therefore the more difficult it is to achieve the inversion population necessary for laser oscillation.

In a quasi three-level Yb:YAG laser, the laser lower level occupation ratio temperature dependency is calculated as indicated in Equation (3) (refer to IEEE Journal of Quantum Electronics, Vol. 33, page 605, 1987).

$$f_a(T) = \frac{g_a \exp(-E_a/kT)}{\sum_i g_i \exp(-E_i/kT)} \quad (3)$$

In the above, $g_i$ is the number of degeneracy within the manifold, $g_a$ is the number of laser lower level degeneracy and $E_i$ is the Stark energy levels within the manifold, $E_a$ is laser lower-level energy.

Figure 4:
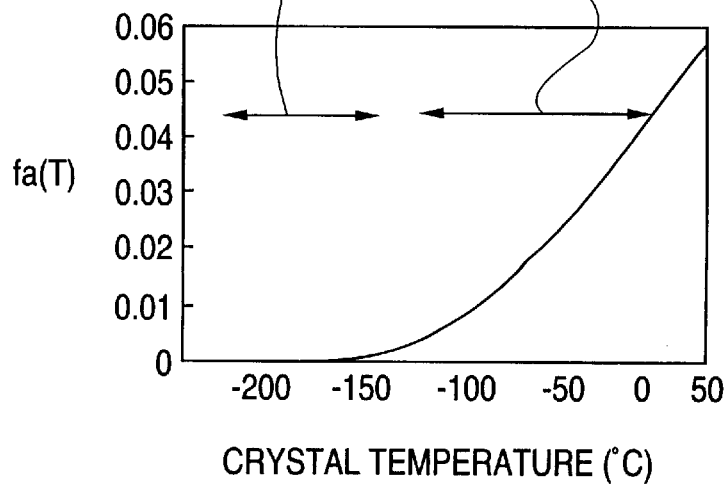
FIG. 4 is a drawing which illustrates the present invention (the temperature dependency of the fractional population of the lower level in quasi-three-level laser).

If the calculation is done using detailed data for the ytterbium ion Stark energy levels, the result is as shown in FIG. 4.

At room temperature, 5% of the ytterbium ions are distributed at the laser lower level of $E_a=613$ cm$^{-1}$.

FIG. 5 shows the oscillation threshold value intensity, $P_{th}(T)/A_{eff}$ as calculated from these values of lower-level occupation ratio. The results of actual experiments coincide extremely well with these curves.

By means of cooling, the lower-level occupation ratio calculated by Equation (3) is reduced, and from Equation (2) it can be seen that the oscillation threshold value becomes successively smaller. In the case in which the excitation power $P_{inc}$ which is incident to the crystal and the absorption efficiency $\eta_{abs}(T)$ can be considered to be constant, the output power $P_{out}(T)$ increases with cooling. This effect is not prominent at temperatures lower than the region of −100° C.

Another effect separate from the above-noted effect occurs with cooling. With cooling, there is generally a gradual narrowing of the absorption line width of the crystal.

There is typically a shrinking to approximately the emission spectrum line width of a high-output semiconductor laser to even smaller.

Figure 6:
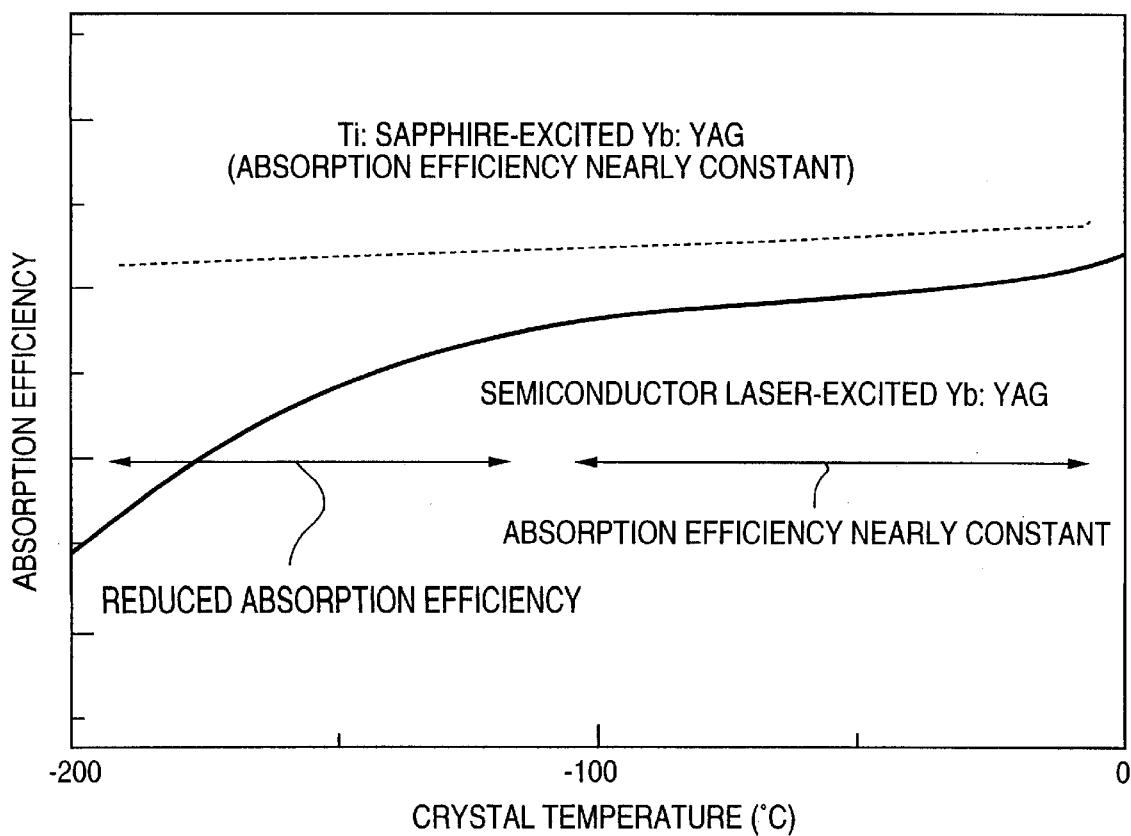
FIG. 6 is a drawing which illustrates the present invention (the temperature dependency of the absorption efficiency in a quasi-three-level laser).

By virtue of this effect, the temperature dependency of the absorption efficiency $\eta_{abs}(T)$, which is established by the overlap of the semiconductor laser emission spectrum with the crystal's absorption spectrum, is as shown in FIG. 6 (which shows the results of an experiment with the case of excitation at 970 nm), so that while the absorption efficiency down to the region of −100° C. is approximately 90% of what it is at room temperature, at lower temperatures the absorption efficiency drops to as little as approximately 30% of the room temperature value.

For this reason, as can be seen by referring to Equation (1), under real conditions, in which case there is a limit to the excitation power $P_{inc}$, by reducing the temperature, there is a reduction in the power that is absorbed by the crystal, this causing the output power $P_{out}(T)$ to drop (for a given constant threshold value $P_{th}(T)$).

Combining the two above-described effects, the following results.

The reduction in lower-level population achieved by cooling has a great effect in increasing the output starting at the region around room temperature.

In the case of cooling from room temperature down to approximately −100° C., it is possible to reduce the threshold value to approximately ¼ (from 4 kW/cm² to 14 kW/cm²).

Because there is no pronounced effect of reducing the absorption efficiency down to the region of −100° C., for a constant excitation power, the laser output power exhibits the following dependency upon laser crystal temperature.

From near room temperature down to −100° C., the absorption efficiency can be treated as nearly constant, and the output will increase because of a reduction in lower level population.

Also, at temperatures lower than −100° C., it is possible to sufficiently reduce the lower-level population and the threshold value.

Figure 3:
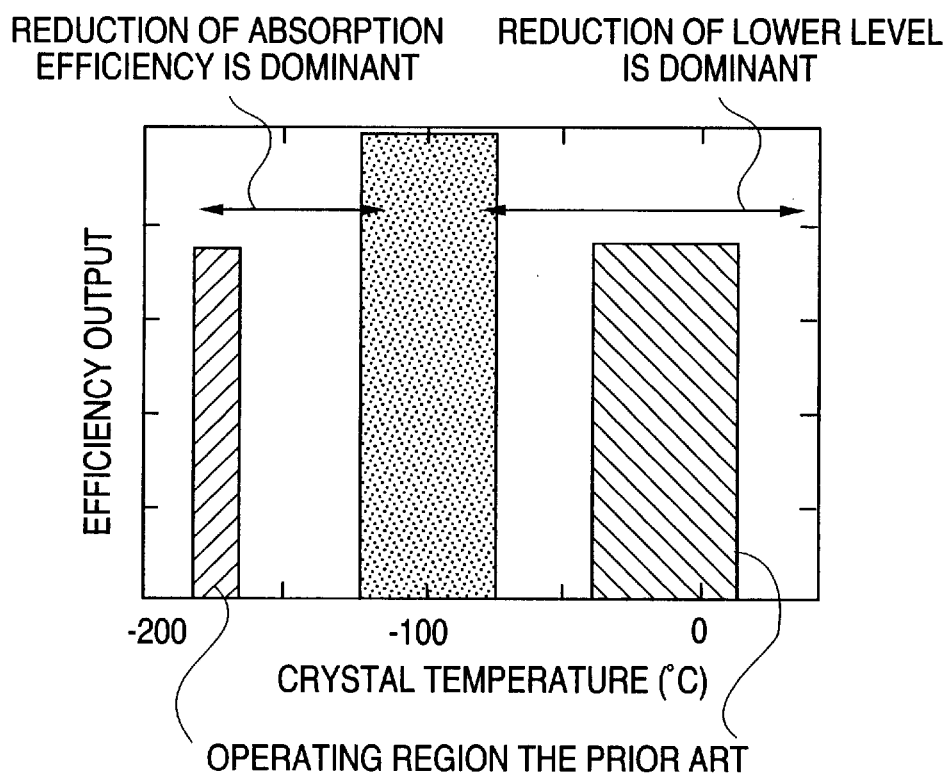
FIG. 3 is a drawing which illustrates the present invention (the temperature dependency of the output and efficiency of a quasi-three-level laser).

However, based on a reduction in the absorption ratio $\eta_{abs}(T)$, the effective excitation power $\eta_{abs}(T)\ P_{inc}$ decreases, causing the output to successively decrease (refer to FIG. 3).

From the above-described phenomena, it can be seen that there exists an optimum temperature range for the cooling of a Yb:YAG laser crystal.

By cooling to −100° C., it is possible to achieve more than an approximately three-fold increase in efficiency and an approximate three-fold increase in output power compared with these values at room temperature.

Additionally, by controlling the crystal temperature to −100° C.±20° C., it is possible to limit the reduction in output to approximately 10 to 20% with respect to the maximum output.

In a Yb:YAG laser that is excited by a semiconductor laser in the 970 nm band, with respect to a 600 mW output (6% efficiency) in the region of room temperature, it was possible in the region of −100° C. to achieve an output of 2.1 W (22% efficiency). Was further cooling, the output was reduced to 1 W (10% efficiency) in the region of −200° C.

The same type of phenomena as described above would, in principle, occur with Yb:YAG lasers of higher output as well.

Additionally, these phenomena are common to other quasi-three-level lasers as well. For example, the same type of temperature dependency is exhibited in a Yb:LuAG laser which also uses ytterbium as the active ion.

According to the present invention, by cooling the solid-state laser crystal to approximately −100° C., which is the optimum operating temperature as established by the effect of an increase in laser output caused by a reduction in lower states and the effect of the narrowing of the absorption line width that causes a lowering of absorption efficiency, it is possible to maximum the optical-to-optical conversion efficiency and output of the laser, thereby also enabling low-power-consumption operation of the laser.

This does not require further cooling, thereby enabling the elimination of coolant such as liquid nitrogen from the laser, which simplifies the laser, enables long service life, and reduces the running cost of the laser.

What is claimed is:

1. A solid-state laser device comprising a quasi-three-level solid-state laser excited by light energy and having a solid-state laser crystal and said device further comprising a temperature-controlling cooling apparatus that maintains a crystal temperature of said solid-state laser crystal at around −100±20° C.

2. A solid-state laser device according to claim 1, wherein said temperature-controlling cooling apparatus is operated by electric power.

3. A solid-state laser device according to claim 1, wherein said quasi-three-level solid-state laser is excited by a semiconductor laser.

4. A solid-state laser device according to claim 1, wherein said solid-state laser crystal of said quasi-three-level solid-state laser comprising ytterbium (Yb) as an active ion.

5. A solid-state laser device according to claim 1, wherein said solid-state laser crystal of said quasi-three-level solid-state laser comprises a Yb:YAG crystal which comprising ytterbium as an activated ion and YAG (yttrium-aluminum-garnet) as a host material.

6. A solid-state laser device according to claim 1, wherein said solid-state laser crystal of said quasi-three-level solid-state laser comprises a Yb:YAG crystal which comprising ytterbium as an activated ion and LuAG (lutetium-aluminum-garnet) as a host material.

7. A solid-state laser device according to claim 1, wherein said solid-state laser crystal of said quasi-three-level solid-state laser is excited by a high-output semiconductor laser having at around 940 nm or 970 nm band, as an excited light power.

8. A solid-state laser device which comprises a quasi-three-level solid-state laser crystal excited by light energy and said device further comprising a temperature-controlling cooling apparatus that operates said solid-state laser crystal at around a temperature of −100±20° C.

9. A solid-state laser device according to claim 8, wherein said solid-state laser crystal comprising a crystal selected from a quasi-three-level solid-state laser comprises a Yb:YAG crystal which comprising ytterbium as an activated ion and YAG (yttrium-aluminum-garnet) as a base material and a quasi-three-level solid-state laser comprises a Yb:YAG crystal which comprising ytterbium as an activated ion and LuAG (lutetium-aluminum-garnet) as a base material.

10. A solid-state laser device according to claim 9, wherein said solid-state laser crystal of said quasi-three-level solid-state laser is excited by a high-output semiconductor laser having at around 940 nm or 970 nm band, as an excited light power.

* * * * *